Feb. 1, 1938.  J. A. GUFFRA  2,106,924
AUTOMATIC LOCOMOTIVE FLANGE OILER
Filed Aug. 7, 1937
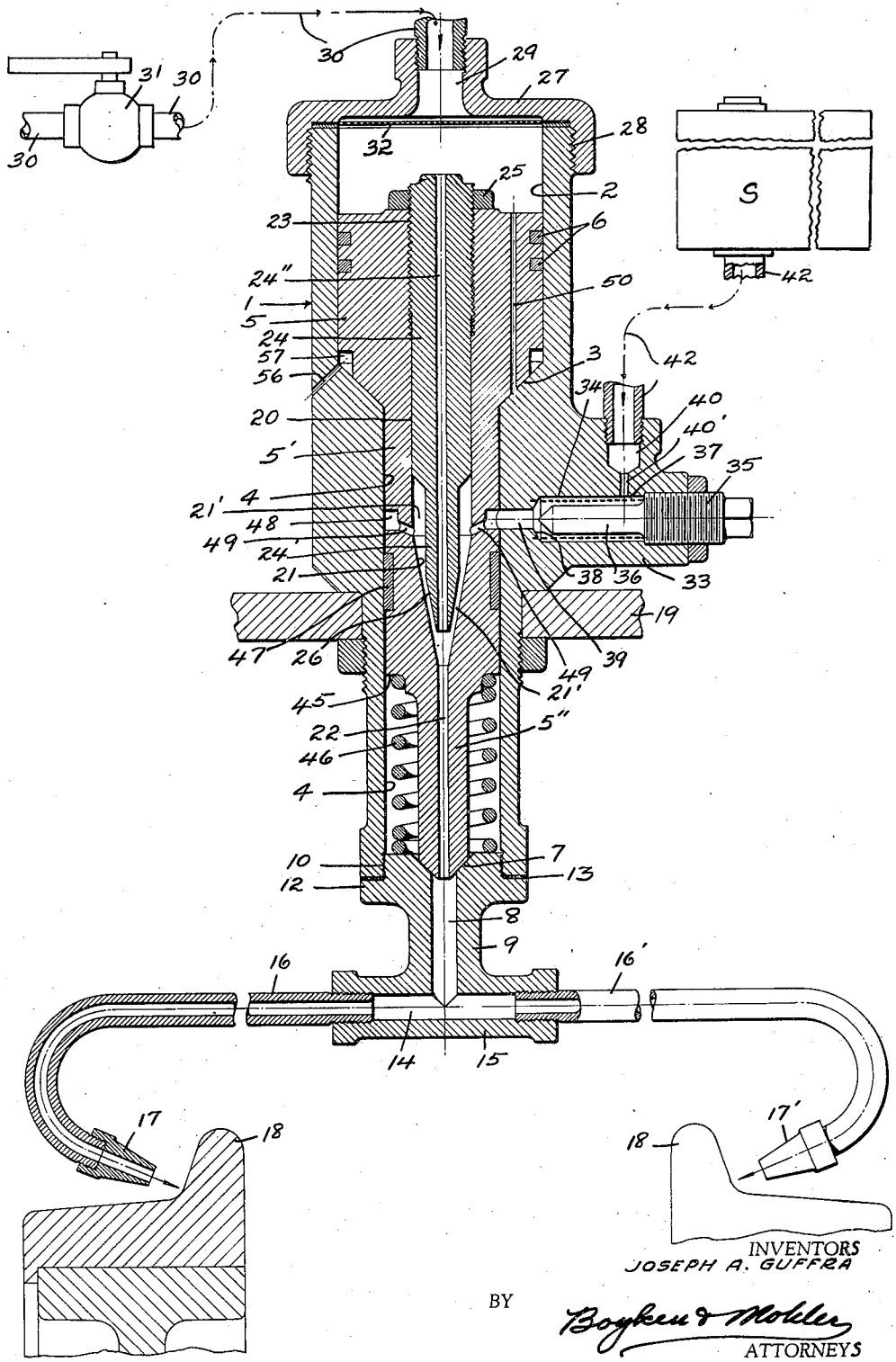
INVENTORS
JOSEPH A. GUFFRA
BY Boyken & Mohler
ATTORNEYS Patented Feb. 1, 1938

2,106,924

UNITED STATES PATENT OFFICE 2,106,924

AUTOMATIC LOCOMOTIVE FLANGE OILER

Joseph A. Guffra, Portola, Calif.

Application August 7, 1937, Serial No. 157,924

12 Claims. (Cl. 184—3)

This invention relates to locomotive flange oilers, and has for its objects the provision of an improved oiler for oiling the flanges of the driving wheels of a locomotive, which oiler automatically opens and closes upon admission of fluid, such as steam or air thereto, for injecting oil under pressure with said fluid against the flanges of the wheels, and which oiler is simple, economical to manufacture, extremely economical in the use of oil, positive in action and self cleaning after each actuation thereof for oiling the flanges. Other objects and advantages will appear in the drawing and description annexed hereto.

The figure shown in the drawing is a vertical cross-sectional view taken through the oiler and one of the oil lines leading to the flange of one of the wheels at one side of the locomotive, while the other oil line and flange is shown in elevation, the oil lines being broken in length to accommodate the sheet and a portion only of the locomotive wheels being shown.

In detail, my oiler comprises an elongated, vertically disposed cylinder 1, with an open ended through bore having cylindrical sides extending longitudinally therethrough. The upper end 2 of said bore is enlarged and the sides of the enlarged end bore 2 taper axially inwardly at 3 to a lower restricted cylindrical bore in axial alignment with the enlarged bore, the sides of the lower bore being designated 4, and which lower bore extends straight downwardly to the lower end of the cylinder 1.

Within the enlarged end 2 of the bore through cylinder 1 is slidably mounted a piston 5 carrying piston rings 6 for sealing against leakage of steam, which rings are seated in conventional grooves formed in the outer walls of the piston for providing a tight sliding seal between the piston and walls of bore 2.

The piston 5 is formed with a downwardly extending, axially aligned extension 5' formed to relatively closely fit in lower bore 4, the walls at the junction between piston 5 and extension 5' being tapered to closely seat against the tapered walls 3 in the cylinder bore. The extension 5' terminates at its lower end in a reduced diameter end portion 5'' in axial elongation of extension 5', the lower end of portion 5'' being tapered to seat against tapered valve seat 7 formed around the upper end of a bore 8 that extends through the leg 9 of a generally T-shaped pipe fitting, which leg is threaded at 10 to threadedly engage threads formed in the lower end of bore 4. An outwardly projecting flange 12 is formed around leg 9 adjacent the threaded end thereof, and a washer 13 between said flange and lower end of the cylinder 1 seals against leakage past the threaded connection between the bore 4 and leg 5. A cross bore 14 extends through the cross head 15 of the T-shaped fitting, which bore 14 communicates intermediate its ends with bore 8, and pipes 16, 16' extend from opposite open ends of bore 14 to discharge nozzles 17, 17'. Nozzles 17, 17' are positioned adjacent flanges 18 of the locomotive driving wheels and are directed to discharge oil and steam toward said flanges at about the juncture between the flanges and wheel treads.

The cylinder 1 is rigidly supported by a bracket 19 to the locomotive, and any suitable brackets, (not shown) may be employed to support the pipes 16, 16' in position, such brackets being common in the art.

The piston 5 is centrally formed with a bore 20 threaded at its upper end, which bore is extended into extension 5', the walls of bore 20 tapering gradually inwardly within extension 5' at 21 to a relatively small bore 22, the latter bore extending straight through the end 5'' to open outwardly at its lower end in alignment with bore 8 in the pipe fitting.

Threadedly supported at its upper end at 23, within bore 20, is an elongated steam or fluid injecting nozzle member 24, extending longitudinally within said bore 20, said member being of reduced outer diameter at its lower end 24' thus leaving a space 21' between the outer sides of said lower end and the walls of bore 20, the end 24' tapering on its outer sides at its lowermost end, as at 26, the angle of the taper being substantially that of the tapered sides 21 between bore 20 and bore 22. The upper end of member 24 projects upwardly of the upper end of piston 5 and a nut 25 engaging the upper end locks the member in any desired position of extension within bore 20. A bore 24'' extends axially through the injection member from end to end opening at its lower end in axial alignment with the upper end of bore 22.

The upper end of cylinder 1 is closed by a cap 27 threadedly secured thereover at 28, which cap is centrally formed with an opening 29 in which is threaded one end of a steam line 30 connecting between the steam supply in the locomotive boiler, which steam line 30 has a manually operative valve 31 therein for controlling the flow of steam to cylinder 1. A screen 32 is preferably secured between cap 27 and the cylinder 1 across bore 2 for filtering any impurities out of the steam or fluid admitted to said bore.

One side of cylinder 1 is formed with an outwardly projecting boss 33 formed with an enlarged passageway 34 extending therethrough at right angles to the axis of bore 4, which passageway is threaded at its outer end outwardly of the cylinder to receive a threaded plug 35 therein, the end portion 36 of said plug disposed inwardly toward the inner end of the passageway being of reduced diameter to leave a substantial space between the sides of the plug at said inner end and the walls of said passageway, and a tubular screen 37 is disposed between the threaded end of the plug in said space, and shoulder 38 in said passageway, said shoulder being formed at the junction between the enlarged passageway 34 and a restricted continuation 39 of the passageway, which restricted continuation 39 extends through the walls of the cylinder 1 at a point between the ends of the reduced bore 4 thereof.

One side of boss 33 is drilled through at right angles to passageway 34 to form a bore 40 communicating between said passageway and the outside of said boss, the inner end of the bore opening into the space between portion 36 of the plug 35 and the walls of the passageway outwardly of the tubular screen 37, and an oil line 42 is threaded at one end into said bore 40 for gravity feeding the relatively crude oil from a source of supply S to passageway 34, the bore 40 being restricted at 40' at the end thereof opening into said passageway.

It will be seen from the foregoing that by adjusting the plug inwardly or outwardly in passageway 34, the fuel supply to the restricted continuation 39 of passageway 34 is regulated as desired, a longer or shorter screen 37 being used as required.

Surrounding end 5" of the piston and between the fitting 9 at the lower end of the cylinder and downwardly facing shoulder 45 at the junction between said end 5" and extension 5', is a relatively stiff coil spring 46 adapted to force the piston upwardly in the cylinder 1, and consequently to move the tapered portion of the piston away from tapered wall 3 of the cylinder bore and at the same time to cause similar movement of tapered end 7 away from the taper seat in fitting 9.

The outer side of the extension 5' of the piston is provided with an annular groove therearound, carrying therein a relatively wide seating ring 47, which ring normally covers the port or restricted portion 39 of passageway 34 when the piston is urged upwardly by spring 46, thus sealing the cylinder against any leakage of oil past said ring, but when the piston is in its "down" position, as shown in the drawing, the port 39 is uncovered and in said "down" position, the oil is free to flow into an annular groove 48 formed in the outer side of extension 5' and from said groove through downwardly inclined openings 49 into the space 21', the groove 48 being positioned to register over port 39 when the piston is in its lowermost position.

Normally the piston 5 is moved upwardly by spring 46 to seal port 39 by the ring 47, in which normal position, the flow of steam in line 30 is turned off by the valve 31. When oiling of the wheel flanges is desired, the operator merely turns valve 31 to "on" position, and the steam flows into the upper end of bore 4 causing the piston to move downwardly to cause registration between oil port 39 and groove 48, and at the same time the steam passes through the bore 24" of the injection member and through bores 22, 8, and 14 and from the latter through the pipes 16, 16' for ejection through nozzles 17, 17' to the wheel flanges 18. The passage of steam from bore 24" into bore 22 causes relatively high partial vacuum in space 21' thus inducing a flow of oil into said space and with the steam to the wheel flanges. Also the piston is sealed against any leakage past the tapered wall 3 and the piston and between the tapered end 7 of the piston and the fitting 9.

Upon turning the valve 31 to off position, the steam and condensed water between valve 31 and the upper end of the piston immediately passes through passageway 50 from the upper side of the piston into the space between the tapered wall 3 of bore 2 and the tapered shoulder of the piston, since the piston is free to rise under force of spring 46. Thus water and steam passes downwardly between the bore 4 and the outer wall of extension 5' and then into groove 48 and through ports 49 into space 21' and from thence downwardly into bore 22 thus washing any impurities out of the oiling device into the pipes 16, 16' and clearing the parts most apt to be detrimentally affected by deposits insofar as affecting the efficient operation of the oiler is concerned. Any steam that may pass upwardly in bore 4 into the space above the tapered shoulder 3 is released through small passageway 56 extending through the cylinder wall into a space 57 formed by an annular groove around the piston 5 at the juncture of the tapered shoulder thereof and the cylindrical sides.

In operation, my device operates satisfactorily using the poorest grade of lubricant and in normal operation will eject oil in the amount of about four drops per minute against the flange without any surplus oil being sprayed on the tread. The frictional resistance between the flanges and rails has been found, by use of my device, to be so low as to show practically no wear over long periods of use whereas locomotives in which the flanges are not oiled, show great wear over the same period of use, the flange surfaces adjacent the rails being worn vertical, where the wear occurs, thus creating a dangerous condition in which the wheels tend to climb over the rails.

The amount of lubricant ejected by my oiler can be easily and quickly regulated, although it should not be adjusted to discharge an amount sufficient to run onto the tread of the wheels, which would cause slippage of the wheels on the rails. The self cleaning feature is important, since the working parts and the ports are readily and efficiently washed clean by merely closing the steam line to the oiler.

Having described my invention, I claim:

1. An oiler of the character described comprising an oil line having a discharge opening arranged and adapted to discharge oil against the flange of a driving wheel of a locomotive, a fluid pressure line, an ejector in said oil line and fluid pressure line arranged and adapted for actuation by the fluid in the pressure line for causing a flow of oil with the fluid to said discharge opening, a valve associated with said ejector operative by the fluid in the pressure line to move for opening the oil line to flow of oil to the ejector and automatically operative upon cessation of admission of fluid under pressure to the ejector to move for closing the oil line to flow of oil in the oil line to the ejector.

2. In a construction as defined in claim 1, said ejector and valve being connected for movement together upon the valve moving to open and to close the oil line.

3. In a construction as defined in claim 1, said ejector including an elongated ejector nozzle, and means mounting said nozzle for movement longitudinally thereof to various positions of adjustment relative to the oil line and fluid pressure line for varying the effective induction influence thereof on the oil in the oil line.

4. An oiler of the character described comprising a tubular housing, an injector in said housing, means for supplying elastic fluid under pressure to within the housing and to the ejector for passage through the latter and out of the discharge end thereof, means including an oil inlet in the housing for supplying oil to a point adjacent the discharge end of the ejector for induction to flow thereof, together with the fluid ejected from the discharge end of the ejector, an outlet in the housing for the ejected fluid and oil carried thereby, means normally closing said oil inlet to flow of oil to the ejector in the absence of a flow of said fluid under pressure to the ejector, and means actuated by the flow of said fluid under pressure to the ejector for opening the oil inlet to flow of oil to the ejector, and an oil line leading from said oil outlet arranged and adapted to carry fluid and oil ejected through the outlet to the flange of a locomotive wheel for discharge against such flange, said oil line having a discharge opening for so discharging the oil and fluid therefrom.

5. In a construction as defined in claim 4, the means normally closing said oil inlet comprising a piston reciprocably mounted within said housing.

6. In a construction as defined in claim 4, the means normally closing said oil inlet comprising a piston reciprocably mounted within said housing, and said ejector being carried by said piston, and the means for supplying oil to a point adjacent the discharge end of the ejector further including a port formed in the side of said piston adapted to register over said oil inlet at one end of the stroke of said piston.

7. An oiler of the character described, comprising an elongated tubular housing provided with a piston slidably fitted thereon for reciprocation longitudinally thereof, a fluid inlet in one end of the housing, an oil outlet in the opposite end of the housing, and an oil inlet in a side of the housing, an ejector in said piston having a through bore with its inlet end opening outwardly of the end of the piston adjacent the fluid inlet and with its discharge end disposed within the piston spaced from the piston body, said piston having a passageway extending from adjacent the discharge end of the ejector toward and opening outwardly of the piston adjacent the fuel outlet, for passing elastic fluid under pressure through the ejector and through the passageway from said fluid inlet to the oil outlet thereby creating a suction in the space between the discharge end of the ejector and the walls of the piston body, said piston being adapted to move toward the oil outlets under influence of the fluid pressure entering the housing through said fluid inlet, and a port formed in the piston adapted to communicate between the oil inlet and said space between the discharge end of ejector and piston body when the piston is moved toward the oil outlet whereby oil will be drawn into said space for passage with the fluid through said oil outlet, yieldable means arranged and adapted to automatically return the piston toward said fuel inlet for closing the oil inlet thereby upon cessation of the flow of fluid under pressure through said fluid inlet, and an oil line leading from said oil outlet having a discharge opening adapted to be positioned to eject oil and fluid against the flange of a locomotive driving wheel.

8. In a construction as defined in claim 7, said piston being formed with a passageway arranged and adapted to pass fluid from the end thereof at the fluid inlet to between a portion of the piston walls adjacent said port and through said port when the piston is moved toward said fluid inlet for cleaning said portion of the walls and said port.

9. In a construction as defined in claim 7, sealing rings on said piston adjacent opposite ends thereof at opposite sides of said port.

10. In a construction as defined in claim 7, said housing being formed with an annular taper seat therearound on its inner sides at a point between the end thereof having the fluid inlet and said oil inlet, and said piston being formed with a taper shoulder adapted to engage said seat for forcing a seal with the seat when the piston is moved toward said oil outlet.

11. A construction as defined in claim 7, said oil outlet being formed with a taper seat therearound, and said piston being formed at its end adjacent said outlet with a tapered surface adapted to engage said seat for forming a seal therewith when the piston is moved toward said oil outlet.

12. In a construction as defined in claim 7, said housing being formed with an annular taper-seat therearound on its inner sides at a point between the end thereof having the fluid inlet and said oil inlet, said piston being formed with a taper-shoulder adapted to engage said seat for forming a seal with said seat, said oil outlet being formed with a taper-seat therearound and said piston being formed with a tapered surface adapted to engage said seat for forming a seal therewith, the taper shoulder and tapered end of the piston and the tapered seat in said housing and the taper-seat around said oil outlet being arranged relatively to simultaneously seal against leakage past the seats upon movement of the piston toward said oil outlet.

JOSEPH A. GUFFRA.